United States Patent
Kirihara

(10) Patent No.: US 9,427,873 B2
(45) Date of Patent: *Aug. 30, 2016

(54) ROBOT CONTROLLER, SIMPLE INSTALLATION-TYPE ROBOT, AND METHOD OF CONTROLLING SIMPLE INSTALLATION-TYPE ROBOT

(71) Applicant: Seiko Epson Corporation, Tokyo (JP)

(72) Inventor: Daisuke Kirihara, Chino (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/475,804

(22) Filed: Sep. 3, 2014

(65) Prior Publication Data

US 2014/0371908 A1 Dec. 18, 2014

Related U.S. Application Data

(63) Continuation of application No. 13/457,873, filed on Apr. 27, 2012, now Pat. No. 8,855,823.

(30) Foreign Application Priority Data

Apr. 28, 2011 (JP) .................................. 2011-101360

(51) Int. Cl.
  G05B 15/00 (2006.01)
  B25J 9/16 (2006.01)
  G05B 15/02 (2006.01)

(52) U.S. Cl.
  CPC ............. *B25J 9/1694* (2013.01); *B25J 9/1653* (2013.01); *G05B 15/02* (2013.01); *G05B 2219/39182* (2013.01); *G05B 2219/40294* (2013.01); *G05B2219/40454* (2013.01); *Y10S 901/01* (2013.01); *Y10S 901/46* (2013.01)

(58) Field of Classification Search
  CPC ........ B25J 9/1641; B25J 9/1653; B25J 9/16; B25J 9/1605
  USPC ................................ 700/258, 261, 264, 280
  See application file for complete search history.

(56) References Cited

U.S. PATENT DOCUMENTS

| 4,428,055 A | | 1/1984 | Zurbrick et al. | |
| 4,881,177 A | * | 11/1989 | McClean | G01N 29/0609 382/151 |
| 5,046,790 A | * | 9/1991 | Onomoto | A47B 88/0411 312/351.13 |

(Continued)

FOREIGN PATENT DOCUMENTS

| JP | 58-046406 | 3/1983 |
| JP | 06-339882 | 12/1994 |

(Continued)

*Primary Examiner* — Khoi Tran
*Assistant Examiner* — Jorge Peche
(74) *Attorney, Agent, or Firm* — Harness, Dickey & Pierce, PLC

(57) ABSTRACT

A robot includes an angular velocity sensor that detects the vibration of a robot. A control device allows the robot to perform a trial operation and acquires the measurement result measured by the angular velocity sensor during the trial operation as vibration information and analyzes the acquired vibration information based on maker evaluating information that is stored in a database. In the maker evaluating information, vibration information and the operating speed appropriate to the installation situation of the robot at which the vibration information is measured are associated with each other. Then, the robot is operated at an operating speed selected based on the analysis result of the vibration information.

8 Claims, 7 Drawing Sheets

(56) References Cited

U.S. PATENT DOCUMENTS

| | | | |
|---|---|---|---|
| 5,453,931 A * | 9/1995 | Watts, Jr. | G05D 1/0272 180/168 |
| 5,627,440 A * | 5/1997 | Yamamoto | G05B 19/416 318/568.21 |
| 6,615,110 B2 * | 9/2003 | Matsuo | B25J 9/1641 318/560 |
| 7,554,282 B2 | 6/2009 | Nakamoto | |
| 2001/0033146 A1 * | 10/2001 | Kato | B25J 9/1641 318/568.22 |
| 2003/0083783 A1 * | 5/2003 | Matsuo | B25J 9/1641 700/245 |
| 2005/0022411 A1 * | 2/2005 | Ganter | F16M 7/00 33/645 |
| 2007/0288124 A1 * | 12/2007 | Nagata | B25J 9/1694 700/258 |
| 2008/0140257 A1 * | 6/2008 | Sato | B25J 9/1633 700/258 |
| 2010/0119146 A1 * | 5/2010 | Inazumi | G06T 5/003 382/153 |
| 2011/0208356 A1 * | 8/2011 | Kato | B25J 9/163 700/253 |
| 2011/0224827 A1 | 9/2011 | Andoh | |

FOREIGN PATENT DOCUMENTS

| | | |
|---|---|---|
| JP | 07-110716 | 4/1995 |
| JP | 07-200030 | 8/1995 |
| JP | 08-039465 | 2/1996 |
| JP | 11-053664 | 2/1999 |
| JP | 2002-127054 A | 5/2002 |
| JP | 2002-337078 A | 11/2002 |
| JP | 2003-145463 A | 5/2003 |
| JP | 2004-314242 A | 11/2004 |
| JP | 2005-023850 A | 1/2005 |
| JP | 2007-118177 A | 5/2007 |
| JP | 2008-084135 A | 4/2008 |
| JP | 2008-188699 A | 8/2008 |
| JP | 2009-015441 A | 1/2009 |
| JP | 2010-064198 A | 3/2010 |
| JP | 2010064198 A * | 3/2010 |
| JP | 4528312 B2 | 8/2010 |
| JP | 2010-253585 A | 11/2010 |
| JP | 05-092378 B2 | 12/2012 |

* cited by examiner

| COMPARISON RESULT | INSTALLATION SITUATION | OPERATION MODE (OPERATING SPEED AND MAXIMUM ACCELERATION) | |
|---|---|---|---|
| | | SPEED PRIORITY MODE | PRECISION PRIORITY MODE |
| MODEL 1 | TYPE 1 | v11, a11 | v12 (<v11), a12 (<a11) |
| MODEL 2 | TYPE 2 | v21 (<v11), a21 (<a11) | v22 (<v21), a22 (<a21) |
| MODEL 3 | TYPE 3 | v31 (<v21), a41 (<a31) | v32 (<v31), a32 (<a31) |
| MODEL 4 | TYPE 4 | v41 (<v31), a41 (<a31) | v42 (<v41), a42 (<a41) |
| ⋮ | ⋮ | ⋮ | ⋮ |

FIG. 4

ROBOT CONTROLLER, SIMPLE INSTALLATION-TYPE ROBOT, AND METHOD OF CONTROLLING SIMPLE INSTALLATION-TYPE ROBOT

CROSS-REFERENCE TO RELATED APPLICATIONS

This is a continuation patent application of U.S. application Ser. No. 13/457,873 filed Apr. 27, 2012 which claims priority to Japanese Patent Application No. 2011-101360, filed Apr. 28, 2011, all of which are expressly incorporated by reference herein in their entireties.

BACKGROUND

1. Technical Field

The present invention relates to a robot controller that controls the operation of a robot mounted in a moving device, a simple installation-type robot in which the robot controller and a robot are mounted in a moving device, and a method of controlling the simple installation-type robot.

2. Related Art

Recently, in manufacturing industries, the movement toward automating the works performed by a worker for a work target by introducing a robot including a multi-joint arm to an assembly line has been brisk. In addition, high-mix low-volume production and shortening of the product cycle have progressed, and robots are frequently relocated according to corresponding recombination of production lines corresponding thereto.

In JP-A-2010-64198, for easy implementation of the relocation of a robot, a simple installation-type robot is disclosed in which a robot and a controller of the robot are mounted on a carriage to which casters and adjuster feet are installed. This simple installation-type robot is simply fixed to a floor surface by separating the caster from the floor surface by using the adjuster foot, and accordingly, the work position of the robot may be displaced due to an inertial force due to the operation of the robot or the like. Accordingly, in JP-A-2010-64198, a technique has been also disclosed for automatically returning the simple installation-type robot to the initial work position when the work position of the robot is displaced.

The drag force applied against the inertial force according to the operation of the robot includes a force due to the rigidity of the housing of the robot and a force received from the floor surface through the adjuster foot. Accordingly, depending on the installation situations of the simple installation-type robot, such as a case where the rigidity of the floor surface is low or a case where a vibration source is present on the periphery of the installation location, the drag force received from the floor surface is not stable, and the above-described positional displacement may easily occur. In JP-A-2010-64198, although the work position of the robot can be returned to the initial work position, there is no change in the control state of the movement of the robot before and after returning to the initial work position, and accordingly, the positional displacement and the returning to the initial work position are repeatedly performed.

SUMMARY

An advantage of some aspects of the invention is that it provides a robot controller that can change the operating speed of a robot mounted in a moving device in accordance with the situation in which the robot is installed, a simple installation-type robot in which the robot controller and a robot are mounted in a moving device, and a method of controlling the simple installation-type robot.

An aspect of the invention is directed to a robot controller that controls an operation of a robot mounted in a moving device. The robot controller includes: a trial operation performing unit that allows the robot to perform a predetermined trial operation; an input unit to which the magnitude of vibration occurring in the robot is input from a vibration measuring unit disposed in the robot; a storage unit in which operating speed information that associates the magnitude of the vibration and an operating speed appropriate to the vibration with each other in advance is stored; an operating speed output unit that outputs the operating speed according to a measurement result based on the measurement result measured by the vibration measuring unit in the trial operation and the operating speed information; and a processing operation performing unit that allows the robot to perform a processing operation at the operating speed output by the operating speed output unit.

According to the above-described robot controller, based on the measurement result measured by the vibration measuring unit during the trial operation and the operating speed information stored in the storage unit, an operating speed that is appropriate to the vibration occurring due to the trial operation, in other words, an operating speed that is appropriate to the situation in which the robot is installed is output from the operating speed output unit. Then, a processing operation performed by the robot is performed at the operating speed output by the operating speed output unit. As a result, the robot can be operated at the operating speed that is appropriate to the situation in which the robot is installed.

It is preferable that the above-described robot controller further includes an operation unit to which the operating speed of one operation mode selected by a user out of the operating speeds of the operation modes that are output by the operating speed output unit is input, wherein the storage unit stores a plurality of sets of the operating speed information that are different from one another and are associated with a plurality of mutually-different operation modes, the operating speed output unit outputs a plurality of operating speeds according to the measurement result measured by the vibration measuring unit for each of the plurality of operation modes, and the processing operation performing unit operates the robot at the operating speed selected by the user.

According to the above-described robot controller, operating speeds corresponding to a plurality of operation modes are output. Accordingly, as an operation mode that can be selected, for example, an operation mode in which the operating speed is relative low can be output in a case where the work precision has high priority over the work time. In addition, an operation mode in which the operating speed is relatively high can be output, for example, in a case where the work time has high priority over the work precision. As a result, the robot can be operated at an operating speed selected by a user through the operation unit. It is preferable that the robot controller further includes a work time calculating unit that calculates a work time according to the operating speeds output by the operating speed output unit for each of the plurality of operation modes, wherein the operating speed output unit outputs the operating speed according to the measurement result measured by the vibration measuring unit and the work time calculated by the work time calculating unit in association with each other.

According to the above-described robot controller, since the work time for each operation mode is calculated, in a case where the operation mode is selected by the user, the user can select the operation mode based on more information.

In the above-described robot controller, it is preferable that the trial operation is configured by an operation period during which a predetermined operation is allowed to the robot and a maintaining period during which the robot is maintained in a predetermined posture immediately after the operation period, and the measurement result is the magnitude of the vibration of the robot during the maintaining period.

According to the above-described robot controller, after the robot is allowed to perform a predetermined operation, the vibration measured by the vibration measuring unit during the period in which the robot is maintained to be in a predetermined posture is configured as the measurement result. As a result, the attenuated form of the vibration occurring in the robot is included in the measurement result of the vibration measuring unit, whereby the measurement result on which the installation situation of the robot is further reflected can be acquired. Another aspect of the invention is directed to a simple installation-type robot in which a robot and a robot controller controlling the robot are mounted in a moving device, wherein the robot controller is the above-described robot controller. According to the above-described simple installation-type robot, the same advantages as those of the above-described robot controller can be acquired.

In the above-described simple installation-type robot, it is preferable that the robot includes: a base unit that is fixed to the moving device; a first movable unit that is connected to the base unit; and a second movable unit that is connected to the base unit through the first movable unit, and the vibration measuring unit is installed to the first movable unit.

Here, the vibration occurring in the second movable unit may be vibration acquired by amplifying the vibration occurring in the base unit by using the joint mechanism connecting the base unit and the first movable unit together and the joint mechanism connecting the first movable unit and the second movable unit. Accordingly, in a case where the vibration measuring unit is disposed in the second movable unit, vibration larger than that of the base unit is measured by the vibration measuring unit through the amplification actions of the joint mechanisms and, whereby there is a concern that the installation situation that is based on the measurement result is markedly different from the actual installation situation. From this point, in the above-described configuration, the vibration measuring unit is disposed in the first movable unit that is connected to the base unit, and accordingly, the vibration for which the amplification action through the joint mechanism is suppressed can be measured. As a result, the vibration according to the situation in which the simple installation-type robot is actually disposed can be measured.

In the above-described simple installation-type robot, it is preferable that the vibration measuring unit is an angular velocity sensor.

More specifically, as examples of the vibration measuring unit that measures vibration other than the angular velocity sensor, there are a displacement sensor, a visual sensor, and the like. However, in a case where the vibration measuring unit is configured by the displacement sensor or the visual sensor, a target object that is used as a reference for measuring the vibration is additionally required for such sensors, and the vibration cannot be measured by only using the displacement sensor or the visual sensor. On the other hand, the angular velocity sensor can measure the vibration even in a case where is no target object used as a reference when the vibration is measured. In other words, according to the above-described configuration, the vibration measuring unit that measures the vibration of the robot may have a relatively simple configuration.

Still another aspect of the invention is directed to a method of controlling a simple installation-type robot in which a robot and a robot controller controlling the robot are mounted in a moving device. The method includes: allowing the robot to perform a predetermined trial operation; measuring the magnitude of vibration of the robot during the trial operation by using a vibration measuring unit that is disposed in the robot and measures the magnitude of the vibration of the robot; outputting an operating speed according to the measurement result based on the measurement result measured by the vibration measuring unit and operating speed information that associates the magnitude of the vibration and the operating speed appropriate to the vibration with each other in advance; and allowing the robot to perform a processing operation at the output operating speed. According to the above-described method of controlling a simple installation-type robot, based on the measurement result measured by the vibration measuring unit during the trial operation and the operating speed information that associates the magnitude of the vibration and the operating speed that is appropriate to the vibration with each other in advance, the robot can be allowed to perform a processing operation at an operating speed output in accordance with the measurement result, in other word, at an operating speed that is appropriate to the situation in which the robot is installed.

BRIEF DESCRIPTION OF THE DRAWINGS

The invention will be described with reference to the accompanying drawings, wherein like numbers reference like elements.

FIG. 4 is a diagram schematically showing the configuration of a maker evaluating information.

DESCRIPTION OF EXEMPLARY EMBODIMENTS

Hereinafter, a robot controller, an easy installation-type robot, and a method of controlling the simple installation-type robot according to embodiments of the invention will be described with reference to FIGS. 1 to 7.

Figure 1:
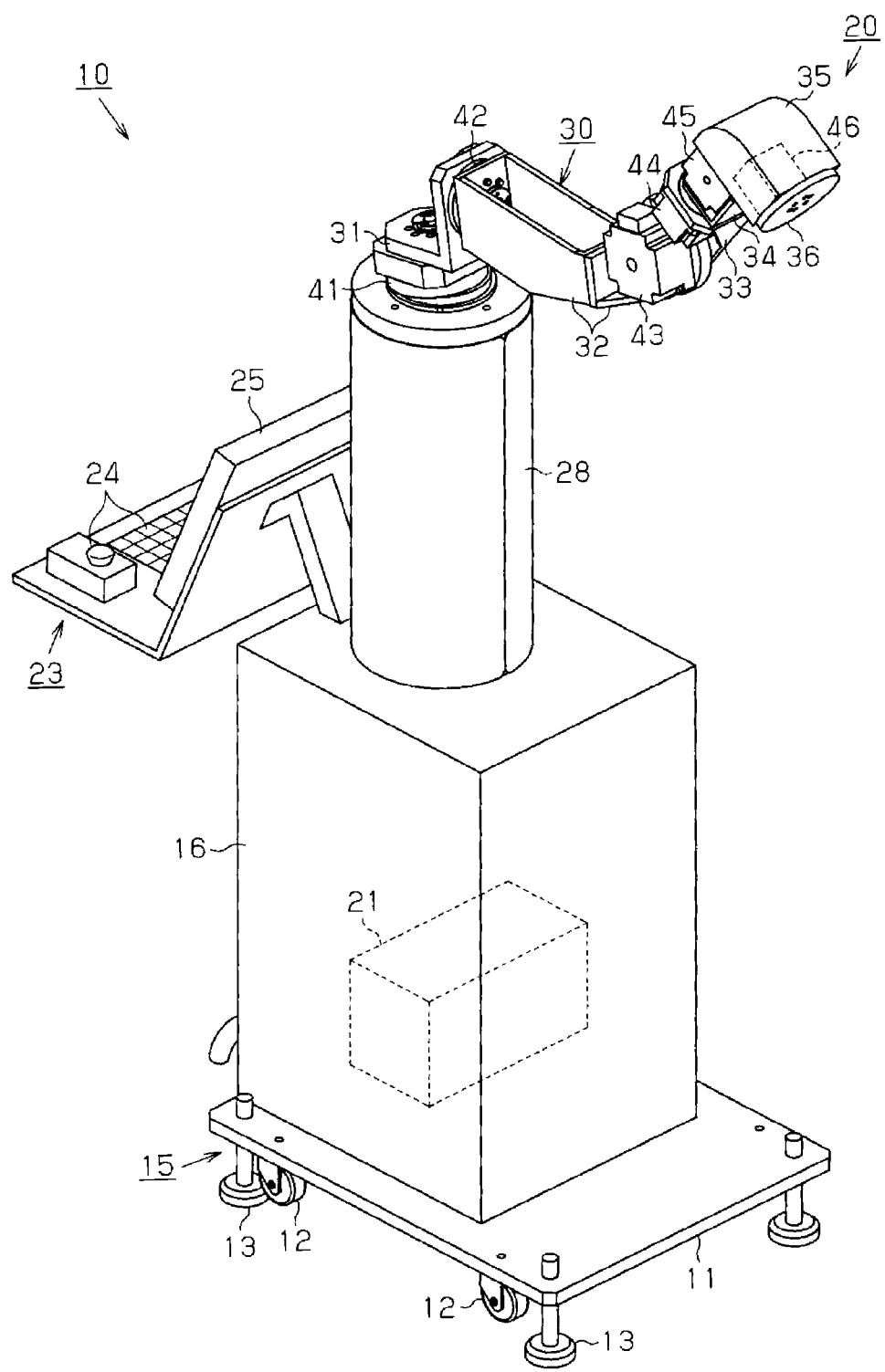
FIG. 1 is a perspective view showing a schematic configuration of a simple installation-type robot according to an embodiment of the invention.

First, a schematic configuration of the simple installation-type robot will be described with reference to FIG. 1. As shown in FIG. 1, the simple installation-type robot 10 includes a carriage 15 as a moving device in which casters 12 and adjuster feet 13 are disposed at the corners of a support board 11 forming a rectangular shape. A stand 16, to which the robot 20 is fixed, is fixedly disposed on the support board 11 of the carriage 15, and a control device 21 configuring a robot controller that controls the operation of the robot 20 is disposed inside the stand 16. On the rear side of the stand 16, an input-output device 23 that is electrically connected to the control device and configures the robot controller is disposed. The input-output device 23 includes an operation unit 24 that is operated by a user and a display unit 25 that is configured by a liquid crystal screen, outputs various types of information input by a user using the operation unit 24 to the control device 21, and displays various types of information input from the control device 21 on the display unit 25.

Figure 2:
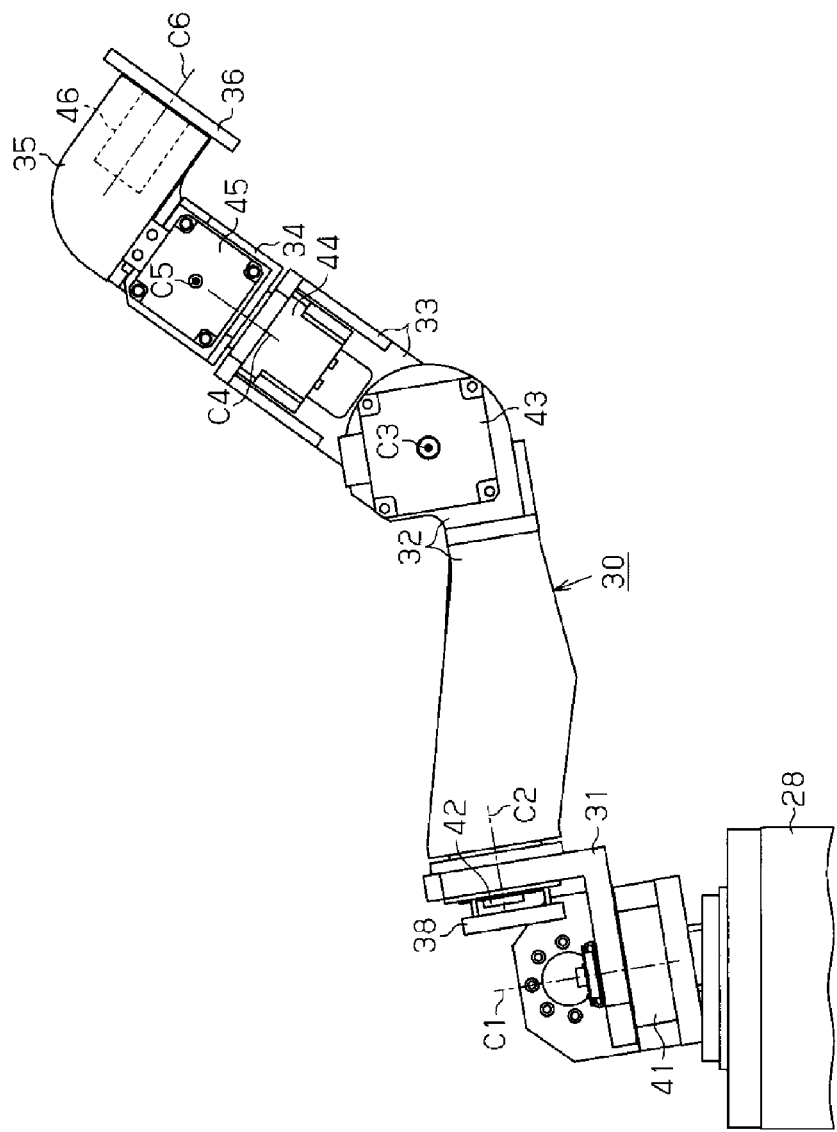
FIG. 2 is a side view showing a side structure of the robot.

Next, a schematic configuration of the robot 20 will be described with reference to FIG. 2. As shown in FIG. 2, the robot 20 is a multi-joint robot including a so-called six-axis multi-joint arm, and an arm unit 30 is connected to a base unit 28 that is fixedly installed to the stand 16. The arm unit 30 is configured by first to fifth arms 31 to 35 and a hand section 36. The first arm 31 as a first movable unit that can be rotated around the rotation axis C1 at its center with respect to the base unit 28 through a joint mechanism 41 is connected to the base unit 28. In the first arm 31, an angular velocity sensor 38 that measures the angular velocity of the first arm 31 is disposed as a vibration measuring unit, and the second arm 32 as a second movable unit that can be rotated around the rotation axis C2 as its center with respect to the first arm 31 through a joint mechanism 42 is connected to the first arm 31. The third arm 33 that can be rotated around the rotation axis C3 as its center with respect to the second arm 32 through a joint mechanism 43 is connected to the second arm 32, and the fourth arm 34 that can be rotated around the rotation axis C4 as its center with respect to the third arm 33 through a joint mechanism 44 is connected to the third arm 33. In addition, the fifth arm 35 that can be rotated around the rotation axis C5 as its center with respect to the fourth arm 34 through a joint mechanism 45 is connected to the fourth arm 34, and a hand section 36 that can be rotated around the rotation axis C6 as its center with respect to the fifth arm 35 is connected to the fifth arm 35 through a joint mechanism 46. By driving servo motors mounted in the joint mechanisms 41 to 46, the arms 31 to 35 and the hand section 36 rotate around the rotation axes C1 to C6 as their centers.

After the simple installation-type robot 10 having such a configuration is moved to a predetermined work position, and the casters 12 are separated from the floor surface by operating the adjuster feet 13, whereby the simple installation-type robot 10 is fixed to the floor surface in a simple manner. By appropriately driving the servo motors mounted in the joint mechanisms 41 to 46 by using the control device 21 in accordance with a work condition input through the operation unit 24 of the input-output device 23 by a user, a work according to the work condition is performed.

Figure 3:
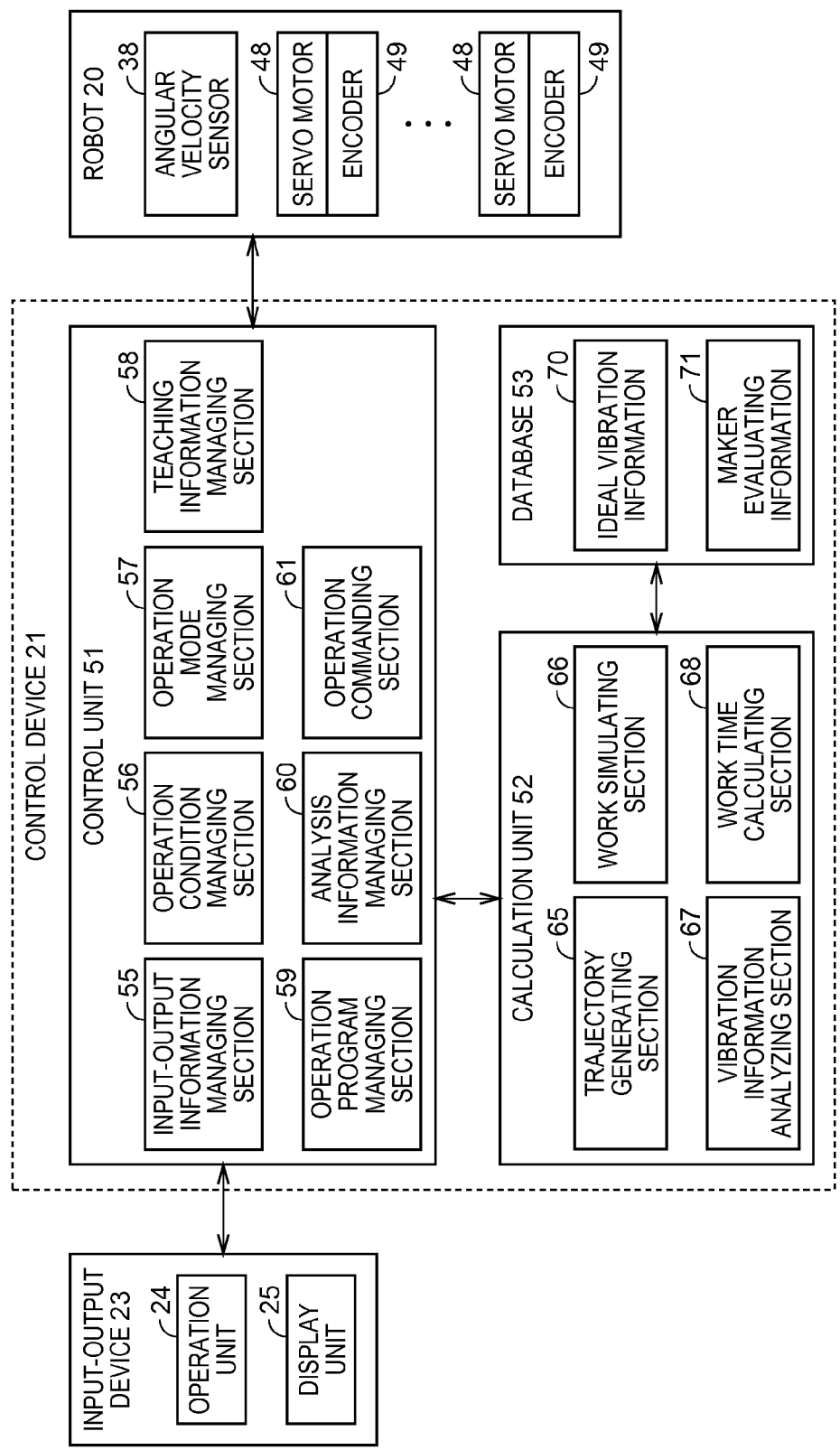
FIG. 3 is a functional block diagram showing the configuration of a simple installation-type robot based on the functions.

Next, the electrical configuration of the above-described simple installation-type robot 10 will be described with reference to FIG. 3. As shown in FIG. 3, in the simple installation-type robot 10, the input-output device 23 and the robot 20 are electrically connected to the control device 21 that controls the operation of the robot 20.

In the robot 20, various sensors, which are not illustrated in the figure, other than the angular velocity sensor 38 disposed in the first arm 31 are also mounted, and detection values detected from the sensors are input to the control device 21 at a predetermined period. The control device 21 controls the operation of the robot 20 based on information input from the input-output device 23 and the robot 20.

The input-output device 23 includes an operation unit 24 operated by the user operating and a display unit 25 on which various types of information are displayed. The operation unit 24 is configured by a keyboard in which various input keys are disposed, a teaching pendant that teaches the operation of the robot 20, and the like. By the user operating the operation unit 24, work conditions for allowing the robot 20 to perform a predetermined work is input, or various types of information displayed on the display unit 25 are selected.

Here, the work conditions represent a series of works performed by the robot 20 for a work target object. In this embodiment, as the work conditions, work scenario information of a work scenario such as the stop position of the hand section 36 including the supplying position and the discharging position of one work target object and the movement of the hand section at the stop position, area information of an allowable operation area in which the operation of the arm unit 30 is allowed, target object information of the outer shape of the work target object, identification information used for identifying the work condition, and the like are input.

The control device 21 is configured by a CPU, a ROM, a RAM, an ASIC, and the like and includes a control unit 51, a calculation unit 52, and a database 53 as a storage unit.

The control unit 51 performs control of the operation of the robot 20, various processes based on various types of information input from the input-output device 23, the output of various types of information displayed on the display unit 25 of the input-output device 23, giving a calculation instruction to the calculation unit 52, and the like. The calculation unit 52 receives a calculation instruction from the control unit 51 and performs calculations necessary for controlling the operation of the robot 20 or a calculation used for acquiring information to be displayed on the display unit 25. In the database 53, various types of information are stored, and information that is necessary for various operations performed by the calculation unit 52 is stored in advance.

After the work conditions are input, the control unit 51 performs an operation initiating process that is a process until the operation of the robot 20 is actually started after an operation for starting the operation of the robot 20 is performed by the user.

In addition, in the operation initiating process, when an operation for operating the robot 20 at an operating speed that is appropriate to the installation situation of the simple installation-type robot 10 is performed by the user, the control unit 51 performs an environment detecting process in which the operating speed of the robot 20 is selected by the user.

In this environment detecting process, the robot 20 is allowed to perform a trial operation, and the vibration information of the robot 20 that is a measurement result of the angular velocity sensor 38 during the trial operation is acquired. Then, the acquired vibration information is analyzed, and as the result of the analysis, installation information that is information on the installation situation of the simple installation-type robot 10 estimated based on the vibration information, mode information that is information in which operation mode having mutually different operating speeds, which are operation modes appropriate for the installation situation, and the operating speed of each operation mode are associated with each other, and production information on the work time required for a series of works in each operation mode are acquired. Then, the acquired information is displayed on the display unit 25, and it is selected by the user whether one of two operation modes based on the mode information is selected as the operation mode of the robot 20 by using the various types of information displayed on the display unit 25 as materials for the determination or the installation situation of the simple installation-type robot 10 is changed.

Here, the trial operation is an operation that is allowed to be performed by the robot 20 so as to acquire the information on the installation situation of the simple installation-type robot 10 and is configured by an operation period during which a predetermined operation is allowed to be performed by the robot and a maintaining period during which the robot 20 is maintained in a predetermined posture immediately after the operation period, in this embodiment.

The control unit 51 includes an input-output information managing section 55 that manages various types of information, an operation condition managing section 56, an operation mode managing section 57, a teaching information managing section 58, an operation program managing section 59, and an analysis information managing section 60. In addition, the control unit 51 includes an operation commanding section 61 that outputs operation instructing values to the servo motors 48 mounted in the joint mechanisms 41 to 46 of the robot 20 at a predetermined control period.

The input-output information managing section 55 manages information input to the control unit 51 from the robot 20, the input-output device 23, and the calculation unit 52 and information output from the control unit 51 thereto. For example, when the mode information and the production information are acquired in the environment detecting process, the input-output information managing section 55 as an operating speed output unit outputs the information to the input-output device 23 so as to be displayed on the display unit 25.

In addition, the input-output information managing section 55 outputs various calculation instructions to the calculation unit 52 together with information necessary for the calculation. For example, when a work condition of new identification information is input, the input-output information managing section 55 generates a calculation instruction for calculating the trajectory of the arm unit 30 based on the work scenario information, the area information, and the target object information as operation conditions of the work condition and outputs the calculation instruction to the calculation unit 52 together with the operation conditions.

The input-output information managing section 55 as an input unit acquires the measurement result of the angular velocity sensor 38 in during the maintaining period of the trial operation as vibration information that represents the magnitude of the vibration of the robot 20. Then, the input-output information managing section 55 generates a calculation instruction for analyzing the installation situation of the simple installation-type robot 10 based on the acquired vibration information and outputs the calculation instruction to the calculation unit 52 together with the vibration information. When a new operation program is generated by the operation program managing section 59 to be described later, the input-output information managing section 55 outputs a calculation instruction for calculating a work time required when the robot 20 is operated in accordance with the operation program to the calculation unit 52.

When a work condition of new identification information is input, the operation condition managing section 56 stores the operation conditions of the work condition, in other words, the work scenario information, the area information, and the target object information in association with the identification information. By storing the operation condition in association with the identification information, the operation condition managing section 56 manages the operation condition as an operation condition corresponding to the identification information. Then, when the identification information is input, the operation condition managing section 56 calls an operation condition corresponding thereto. The input-output information managing section 55 outputs the called operation condition to the input-output device 23 so as to be displayed on the display unit 25.

The operation mode managing section 57 stores the operating speed of the operation mode actually selected by the user in the environment detecting process in association with the identification information of the work condition. By storing the operation mode in association with the identification information of the work condition, the operation mode managing section 57 manages the identification as a history of the selected operation mode. Then, when the identification information is input, the operation mode managing section 57 calls an operation mode corresponding thereto. The input-output information managing section 55 appropriately outputs the operation mode called based on the input identification information as an operation mode selected in the past to the input-output device 23 so as to be displayed on the display unit 25.

The teaching information managing section 58 stores teaching information, in which the trajectory of the arm unit 30 that is used for allowing the robot 20 to perform a work corresponding to the operation condition is represented, in association with the identification information. By storing the calculation result of the calculation unit 52 for the calculation instruction for calculating the trajectory of the arm unit 30 as the teaching information in association with the identification information, the teaching information managing section 58 manages the teaching information as teaching information corresponding to the identification information thereafter. Then, when the identification information is input, the teaching information managing section 58 calls the teaching information corresponding thereto.

The operation program managing section 59 stores an operation program that allows the robot 20 to perform a trial operation. In addition, the operation program managing section 59 generates operation programs that implement the trajectory of the arm unit 30 represented in the teaching information at the operating speeds of two operation modes based on the mode information that is the result of analyzing the vibration information and stores the generated operation programs in association with the identification information. By storing the generated operation programs in association with the identification information, the operation program managing section 59 manages the generated operation programs as a history of the operation programs corresponding to the identification information thereafter. The operation program managing section 59, based on the identification information or the information on the operation mode selected by the user, calls an operation program corresponding to the information.

The analysis information managing section 60 stores analysis information as a result of analyzing the vibration information through the calculation unit 52 in association with the identification information. In other words, the analysis information managing section 60 stores installation information on the installation situation of the robot 20 as a result of analyzing the vibration information, mode information in which two operation modes appropriate to the installation situation and the operating speeds at the operation modes are associated with each other, production information relating to the work time required for a series of works in each operation mode in association with the identification information. By storing the analysis information in association with the identification information, the analysis information managing section 60 manages the analysis information as a history of the analysis result corresponding to the identification information thereafter. Thus, when identification information is input, the analysis information managing section 60 calls the analysis information corresponding thereto. The input-output information managing section 55 appropriately outputs the analysis information called based on the input identification information to the input-output device 23 and is displayed on the display unit 25.

The operation commanding section 61 generates an operation instructing value at a predetermined control period for each servo motor 48 based on an operation program called by the operation program managing section 59 and controls the operation instructing value through feedback control based on a detected value acquired by an encoder 49 detecting the rotation angle of the servo motor 48. The input-output information managing section 55 outputs the operation instructing value generated by the operation commanding section 61 to each servo motor 48. In other words, by operating the robot 20 based on the operation program used for performing a trial operation, the input-output information managing section 55 and the operation commanding section 61 serve as a trial operation performing unit, and, by operating the robot 20 based on the operation program corresponding to the operation mode selected by the user, the input-output information managing section 55 and the operation commanding section 61 serve as a processing operation performing unit. In FIG. 3, only some of a plurality of servo motors 48 and encoders 49 are illustrated.

Subsequently, the calculation unit 52 will be described. The calculation unit 52 includes a trajectory generating section 65 that performs calculations corresponding to the calculation instruction transmitted from the control unit 51, a work simulating section 66, a vibration information analyzing section 67 that analyzes the vibration information by referring to various types of information stored in the database 53, and a work time calculating section 68.

The trajectory generating section 65 receives a calculation instruction for calculating the trajectory of the arm unit 30 based on the operation condition and calculates the trajectory of the arm unit 30 based on the operation condition. The trajectory generating section 65 calculates the trajectory of the arm unit 30 such that the operation condition is satisfied, in other words, such that a part of the arm unit 30 including a gripped work target object does not deviate from the allowable operation area when the work represented in the work scenario information is performed by the robot 20. The work simulating section 66 checks whether or not the trajectory of the arm unit is within the allowable operation area by performing a simulation of the trajectory of the arm unit 30 that is calculated by the trajectory generating section 65. Based on the result of the simulation performed by the work simulating section 66, in a case where the calculated trajectory is within the allowable operation area, the trajectory generating section 65 outputs the information in which the trajectory is represented to the control unit 51 as teaching information. On the other hand, in a case where the calculated trajectory exceeds the allowable operation area, the trajectory generating section 65 calculates the trajectory of the arm unit 30 again.

The vibration information analyzing section 67 receives a calculation instruction used for analyzing the installation situation of the simple installation-type robot 10 based on the vibration information and analyzes the vibration information by referring to various types of information stored in the database 53.

Here, the various types of information stored in the database 53 in advance will be described. In the database 53, ideal vibration information 70 and maker evaluating information 71 are stored.

The ideal vibration information 70 is information in which vibration information acquired when the trial operation is performed by the simple installation-type robot 10 that is under an ideal installation situation, in which any vibration source is not present on the periphery of the floor surface having sufficient rigidity, is represented.

The maker evaluating information 71, as shown in FIG. 4, is information in which each result of comparison between vibration information, for which the installation situation is checked in advance, and the ideal vibration information is associated with the installation situation checked in advance. In other words, the vibration information acquired in the environment detecting process and the ideal vibration information are compared with each other, and the result of the comparison is compared with the maker evaluating information 71, whereby the installation situation of the simple installation-type robot 10 can be estimated.

In addition, the maker evaluating information 71 is operating speed information in which, for each installation situation checked in advance, upper limit values of the operating speed and the acceleration appropriate to the installation situation are set. In the maker evaluating information 71, a speed priority mode and a precision priority mode that are operation modes having different upper limit values of the operating speed and the acceleration can be associated with each installation situation. In other words, the maker evaluating information 71 is configured by operating speed information corresponding to the speed priority mode and operating speed information corresponding to the precision priority information. The speed priority mode is an operation mode in which, in a case where the robot 20 is operates in a corresponding installation situation, the arm unit 30 is operated at a relatively high speed in a range in which it is difficult for the displacement of the simple installation-type robot 10 to occur. In other words, the precision priority mode is an operation mode in which, in a case where the robot 20 is operated in a corresponding installation situation, the arm unit 30 is operated at a relatively low speed in a range in which it is difficult for the displacement of the simple installation-type robot 10 to occur. In other words, the speed priority mode is an operation mode in which the work precision is decreased due to the vibration of the arm unit 30 during an operation in which the work time is relatively short. On the other hand, the precision priority mode is an operation mode in which the work precision is improved by suppressing the vibration of the arm unit 30 during the operation in which the work time is relatively long.

In addition, the upper limit values of the operating speed and the operating acceleration in each operation mode corresponding to each installation situation are set to values based on various experiments, simulations, or the like using the simple installation-type robot 10. In addition, the upper limits of the operating speed and the operating acceleration in the speed priority mode of each installation situation are set such that a higher operating speed and higher operating acceleration are set as the installation situation is closer to the installation situation in which vibration information close to the ideal vibration information is acquired. Similarly, the upper limits of the operating speed and the operating acceleration in the precision priority mode of each installation situation are set such that a higher operating speed and higher operating acceleration are set as the installation situation is closer to the installation situation in which vibration information close to the ideal vibration information is acquired.

The vibration information analyzing section 67 compares the vibration information input from the control unit 51 and the ideal vibration information 70 stored in the database 53 with each other and estimates the installation situation of the simple installation-type robot 10 by comparing the comparison result with the maker evaluating information 71 stored in the database 53. Then, the vibration information analyzing section 67 outputs the installation information that is information on the estimated installation situation and the mode information associating two operation modes appropriate to the installation situation and the operating speed in each operation mode with each other to the control unit 51.

The work time calculating section 68 receives a calculation instruction for calculating the work time at the time of operating the robot 20 in accordance with the operation program generated by the operation program managing section 59, calculates a work time at the time of operating the robot 20 in accordance with the operation program, and outputs information based on the calculation result to the control unit 51 as production information.

Next, the sequence of the operation starting process that is a process until the operation of the robot 20 is actually started after an operation for starting the operation of the robot 20 is performed by the user will be described with reference to FIG. 5.

Figure 5:
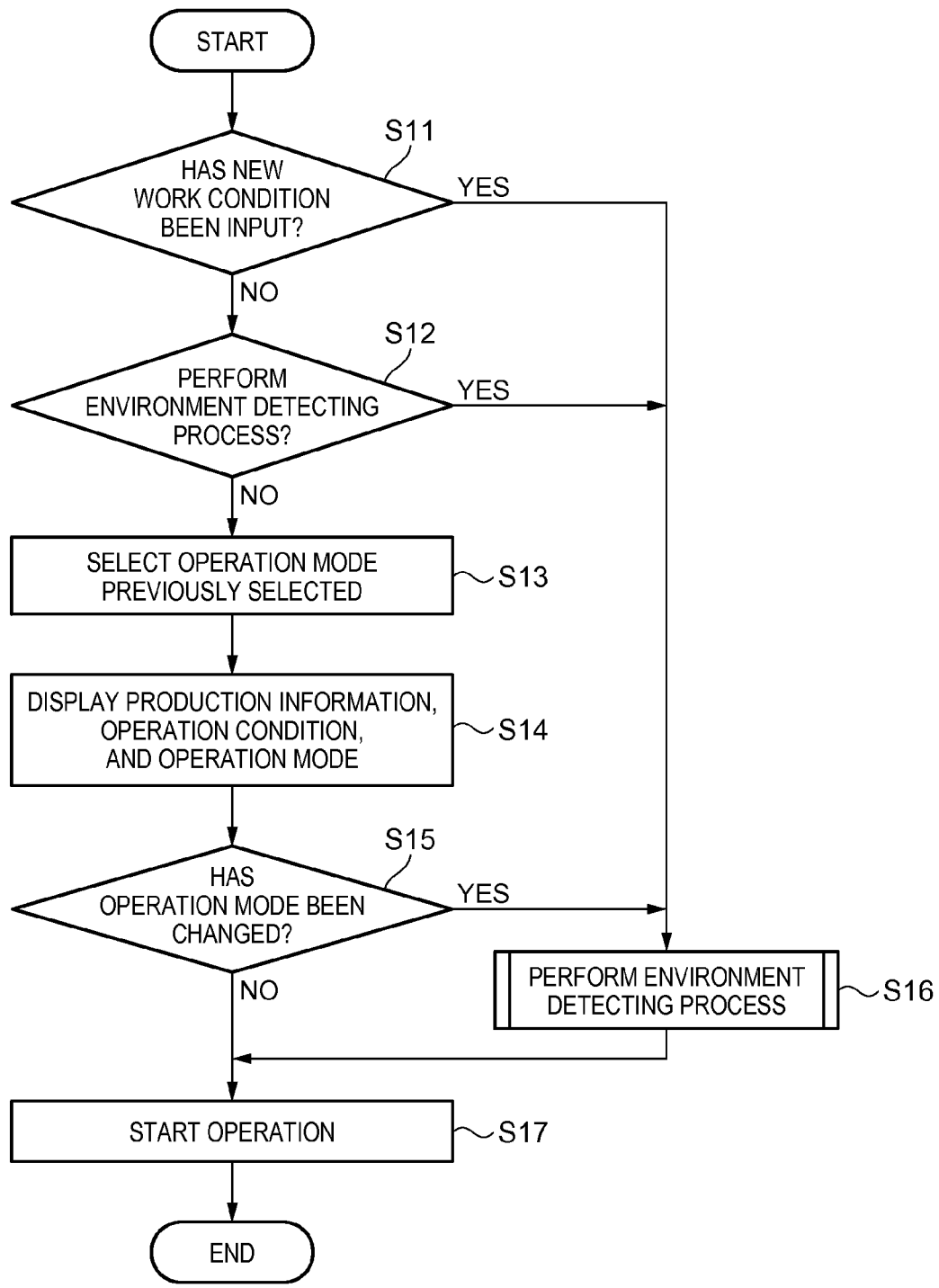
FIG. 5 is a flowchart showing the sequence of an operation starting process.

As shown in FIG. 5, in the operation starting process, first, it is determined whether or not the operation condition is a newly input operation condition based on the identification information of the input operation condition (Step S11).

In a case where the input operation condition is a new operation condition (Step S11: Yes), the process proceeds to Step S16, the environment detecting process is performed, and then, the operation of the robot 20 is started (Step S17).

On the other hand, in a case where the input operation condition is the operation condition input in the past (Step S11: No), a display representing whether or not the environment detecting process is performed is presented on the display unit 25, and whether or not the environment detecting process is performed is input by the user through the operation unit 24 (Step S12). In Step S12, in a case where the operation representing that the environment detecting process is performed is performed by the user (Step S12: Yes), the process proceeds to Step S16, the environment detecting process is performed, and then the operation of the robot 20 is started (Step S17).

On the other hand, in Step S12, in a case where an operation representing that the environment detecting process is not performed is performed by the user (Step S12: No), the operation mode that was previously selected for the identification information is selected as the operation mode (Step S13). Then, together with information relating to the operation mode, the operation condition of the identification information and the production information corresponding to the operation mode are output to the input-output device 23 and are displayed on the display unit 25 (Step S14).

Next, in Step S15, whether or not the operation mode is changed is input through the operation unit 24 by the user who has checked the production information and the like displayed on the display unit 25 in Step S14 (Step S15).

In Step S15, in a case where the operation for changing the operation mode is performed (Step S15: Yes), the process proceeds to Step S16, the environment detecting process is performed, and then, the operation of the robot 20 is started (Step S17).

On the other hand, in Step S15, in a case where an operation for not changing the operation mode is performed (Step S15: No), an operation program corresponding to the operation mode that was previously selected is called, and the operation of the robot 20 is started in accordance with the operation program (Step S17).

Figure 6:
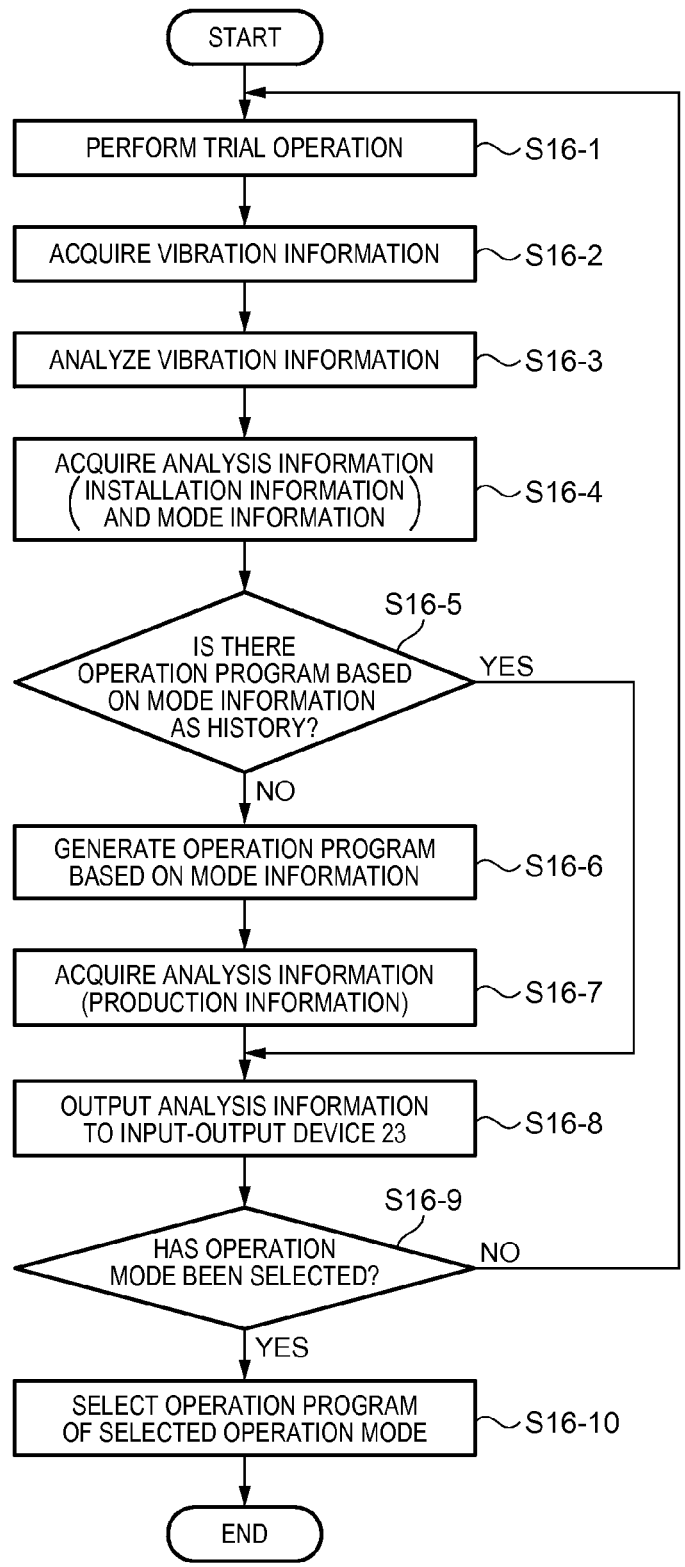
FIG. 6 is a flowchart showing the sequence of an environment detecting process.

Next, the sequence of the environment detecting process corresponding to Step S16 in the above-described operation starting process will be described with reference to FIG. 6. As illustrated in FIG. 6, in the environment detecting process, first, a trial operation is performed for the robot 20 (Step S16-1), the vibration information of the robot 20 is acquired based on the measurement result of the angular velocity sensor 38 during the trial operation maintaining period (Step S16-2). Next, in Step S16-3, based on the ideal vibration information 70 and the maker evaluating information 71 that are stored in the database 53, a calculation instruction is output to the calculation unit 52 together with various types of information so as to analyze the vibration information acquired in Step S16-2. Then, as the analysis information that is the result of the analysis, the installation information relating to the installation situation of the simple installation-type robot 10 and the mode information in which the operation modes that are appropriate to the installation situation and have mutually different operating speeds and the operating speed in each operation mode are associated with other are acquired (Step S16-4).

Next, in Step S16-5, based on the identification information of the work condition and the acquired mode information, it is determined whether or not there is an operation program of the operation mode corresponding to the mode information as a history.

In a case where the operation program is not present as a history in Step S16-5 (Step S16-5: No), an operation program is generated for each operation mode based on the operating speed of each operation mode and the teaching information that are represented in the acquired mode information (Step S16-6).

Then, a calculation instruction for calculating the work time for each operation mode based on the operation program generated in Step S16-6 is output, and the production information that is based on the result of the calculation is acquired as the analysis information (Step S16-7).

On the other hand, in a case where the operation program is present as the history in Step S16-5 (Step S16-5: Yes), since the production information that is based on the operation program is also present as the history, the Step S16-6 and Step S16-7 are skipped, and the process proceeds to Step S16-8.

Figure 7:
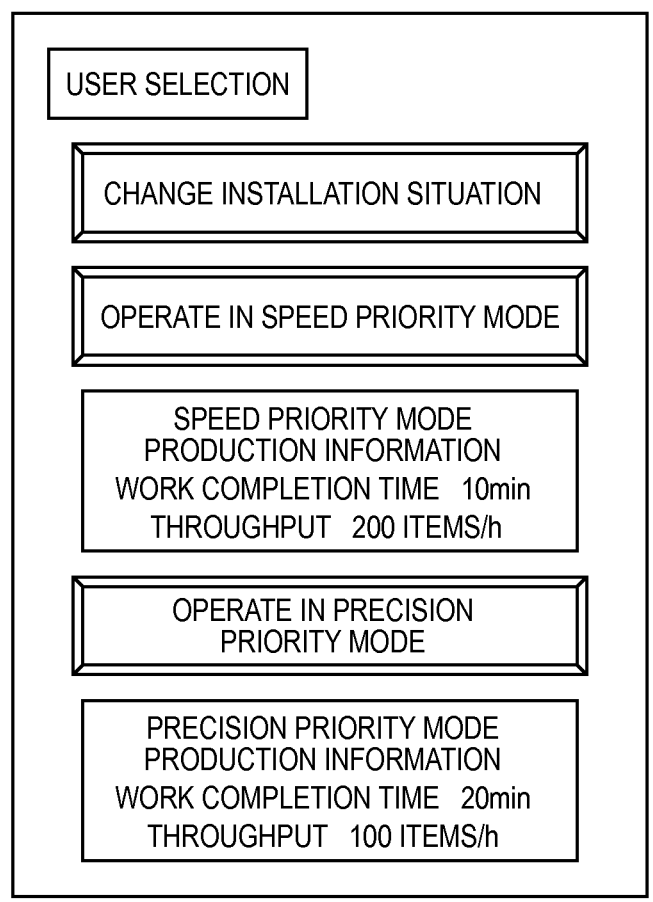
FIG. 7 is a diagram schematically showing an example of a display form of analysis information.

Next, in Step S16-8, the mode information and the production information as the analysis information are output to the input-output device 23 and are displayed on the display unit 25. FIG. 7 shows an example of a display form of the analysis information on the display unit 25. As shown in FIG. 7, the user determines whether or not the installation situation is changed or one of two operation modes is selected by using the displayed information as a determination material.

Next, in Step S16-9, it is determined whether or not the user selects the operation mode in accordance with the analysis information displayed on the display unit 25 in Step S16-8. In a case where the operation mode is not selected in Step S16-9 (Step S16-9: No), in other words, in a case where an operation for changing the installation situation of the simple installation-type robot 10 is performed, when an operation for starting the operation is performed after the installation situation is changed, the trial operation of the robot 20 is performed again (Step S16-1).

On the other hand, in a case where the operation mode is selected in Step S16-9 (Step S16-9: Yes), the operation program of the selected operation mode is selected (Step S16-10), and a series of processes ends.

Next, the operation of the simple installation-type robot 10 having the above-described configuration will be described. In the above-described simple installation-type robot 10, a trial operation for analyzing the installation situation of the simple installation-type robot 10 is performed, and the vibration information is acquired which represents the magnitude of the vibration of the robot 20 during the trial operation. Then, the vibration information is analyzed, and the installation information relating to the installation situation of the simple installation-type robot 10, which is estimated based on the vibration information, and the mode information in which operation modes that are appropriate to the estimated installation situation and have mutually different operating speeds and the operating speed in each operation mode are associated with each other are acquired. In addition, the production information relating to each one of the speed priority mode and the precision priority mode represented in the mode information is acquired. The acquired information is output to the input-output device 23 and is displayed on the display unit 25. The user determines whether the robot 20 is operated in one operation mode of the two operation modes or the installation situation of the simple installation-type robot 10 is changed. Then, in a case where one operation mode is selected by the user, the robot 20 is operated at an operating speed based on the selected operation mode.

According to the control device 21 and the input-output device that configure the robot controller, the simple installation-type robot 10, and the method of controlling the simple installation-type robot 10 according to the embodiments, the following advantages can be acquired.

(1) According to the above-described embodiment, the robot 20 can be operated at an operating speed that is appropriate to the installation situation of the simple installation-type robot 10. As a result, since the robot 20 can be operated at an operating speed according to the installation situation of the simple installation-type robot 10, even a worker not having professional knowledge for the relocation of the simple installation-type robot 10 can relocate the simple installation-type robot 10 in an easy manner.

(2) In addition, in the operating speed that is appropriate to the installation situation of the simple installation-type robot 10, the speed priority mode in which the operating speed is relatively high and the precision priority mode in which the operating speed is relative low can be selected. Accordingly, when the operation time has high priority over the work precision, the speed priority mode can be selected. On the other hand, when the work precision has high priority over the operation time, the precision priority mode can be selected. In other words, an operating speed according to the content of the operation can be selected.

(3) According to the above-described embodiment, production information relating to the speed priority mode and the precision priority mode that have an operating speed that is appropriate to the installation situation of the simple installation-type robot 10 is output to the input-output device 23 and is displayed on the display unit 25. Accordingly, the user can select the operation mode based on more information.

(4) According to the above-described embodiment, during the trial operation that is configured by the operation period and the maintaining period, the measurement result acquired by the angular velocity sensor 38 during the maintaining period is acquired as the vibration information. Here, in a case where the measurement result acquired by the angular velocity sensor 38 is acquired as the vibration information during the operation period, the vibration relating to the operation of the robot 20 is included in the vibration information. From this point, according to the above-described configuration, the vibration information is acquired, which includes the attenuated form of the vibration occurring in the robot 20 during the operation period, as the vibration information. Accordingly, the vibration information on which installation situation of the simple installation-type robot 10 is further reflected can be acquired. As a result, the installation situation of the simple installation-type robot 10 can be determined more accurately.

(5) According to the above-described embodiment, the angular velocity sensor 38 is disposed in the first arm 31. Here, for example, the vibration occurring in the second arm 32 may be vibration that is amplified by the joint mechanism 41 connecting the stand 16 and the first arm 31 together and the joint mechanism 42 connecting the first arm 31 and the second arm 32. Accordingly, in a case where the angular velocity sensor 38 is disposed in the second arm 32, vibration larger than that of the stand 16 is detected through the amplification actions of the joint mechanisms 41 and 42, whereby there is a concern that the installation situation specified based on the vibration information is markedly different from the actual installation situation. From this point, in the above-described configuration, the angular velocity sensor 38 is disposed in the first arm 31 connected to the base unit 28 that is fixedly installed to the stand 16 through the joint mechanism 41, and accordingly, the vibration for which the amplification action through the joint mechanism is suppressed can be detected. As a result, vibration information that is close to the actual installation situation is acquired, whereby an operating speed that is appropriate to the installation situation of the simple installation-type robot 10 can be selected. In addition, since the angular velocity sensor 38 is disposed in the first arm 31, the vibration of the first arm 31 can be controlled to be suppressed based on the measurement value acquired by the angular velocity sensor 38 during the operation of the robot 20.

(6) In the above-described embodiment, the vibration information is acquired based on the measurement value measured by the angular velocity sensor 38. As examples of the sensor detecting the vibration other than the angular velocity sensor, there are a displacement sensor, a visual sensor, and the like. However, in a case where the vibration information is acquired based on the displacement sensor or the visual sensor, a target object that is used as a reference for measuring the vibration is necessary, and the vibration cannot be measured by only using the displacement sensor or the visual sensor. On the other hand, the angular velocity sensor 38 can measure the vibration even in a case where is no target object used as a reference when the vibration is measured. In other words, according to the above-described configuration, the configuration used for measuring the vibration of the robot 20 can be simplified.

In addition, the above-described embodiment can be modified as follows.

In the environment detecting process according to the above-described embodiment, the user selects the operation mode of the robot 20 based on the analysis information displayed on the display unit 25. This may be changed such that the operation mode to be selected out of the speed priority mode and the precision priority mode that can be selected based on the analysis of the vibration information is input in advance, for example, at the time of inputting the work condition so as to automatically select the operation mode in the environment detecting process.

In the above-described embodiment, the angular velocity sensor is used as the vibration measuring unit. However, the vibration measuring unit is not limited thereto, and thus, any vibration measuring unit that can detect the vibration of the robot 20 during the trial operation may be used, and, for example, it may be a displacement sensor, a visible sensor, or an acceleration sensor.

In the above-described embodiment, the angular velocity sensor 38 as the vibration measuring unit is disposed in the first arm 31. However, the invention is not limited thereto, and the angular velocity sensor 38, for example, may be disposed in the second arm 32 of the robot 20 and may be disposed in the stand 16 to which the robot 20 is fixed.

In the above-described embodiment, the trial operation performed for acquiring the vibration information is configured by the operation period and the maintaining period, and the vibration of the robot 20 during the maintaining period is acquired as the vibration information. However, the invention is not limited thereto, and the vibration information may be acquired during a period including the operation period and the maintaining period, or the trial operation may be performed only during the operation period.

In the calculation unit 52 according to the above-described embodiment, although the work time calculating section 68 is disposed which calculates the work time at the time of operating the robot 20 in each operation mode that can be selected in accordance with the installation situation, a configuration in which the work time calculating section 68 is omitted may be employed.

The maker evaluating information 71 according to the above-described embodiment, for each installation situation estimated based on the vibration information, are configured by the operating speed information corresponding to two operation modes having mutually different operating speeds, which are appropriate to the installation situation, that is, the operating speed information corresponding to the speed priority mode and the operating speed information corresponding to the precision priority mode. However, the invention is not limited thereto, and in a case where the maker evaluating information 71 is configured by operating speed information corresponding to a plurality of operation modes having mutually different operating speeds, for example, operating speed information corresponding to an operation mode in which the operating speed is lower than that of the speed priority mode and is higher than the operating speed of the precision priority mode may be further included. In addition, the invention is not limited to the plurality of operation modes, and, for example, the maker evaluating information 71 may be configured by only operating speed information corresponding to one operation mode, for example, the precision priority mode for each installation situation estimated based on the vibration information.

In the above-described embodiment, as the analysis information of the vibration information, installation situation improving information may be included in which a method of improving the installation situation of the simple installation-type robot 10 is represented.

In other words, in the database 53, the improving method information is stored in which each installation situation defined in the maker evaluating information 71 is associated with an improving method used for allowing the installation situation to approach the ideal situation. The vibration information analyzing section 67 of the calculation unit 52 selects an improving method for changing the estimated installation situation to the ideal installation situation based on the installation situation of the simple installation-type robot 10 that is estimated in accordance with the result of comparison between the vibration information and the ideal vibration information and the improving method information stored in the database 53. Then, improvement information that is information relating to the selected improving method is output to the control unit 51. The input-output information managing section 55 outputs the improvement information to the input-output device 23 as the analysis information of the vibration information together with the mode information and the production information so as to be displayed on the display unit 25.

According to such a configuration, even in a case where the improvement of the installation situation of the simple installation-type robot 10 is selected in Step S16-9 of the environment detecting process shown in FIG. 6, the user can change the installation situation of the simple installation-type robot 10 by referring to the improvement information. Accordingly, a user's effort for searching for an improving method for allowing the installation situation of the simple installation-type robot 10 to approach the ideal installation situation is not required.

Each of the managing sections 56 to 60 according to the above-described embodiments may be configured such that corresponding information is stored in the database 53 in association with the identification information, and various types of information are managed by appropriate calling managed information based on the input identification information.

Generally, when an abnormal value is input from various types of sensor, the robot controller stops the operation of the robot 20. Such stopping of the operation may be caused by the installation situation of the simple installation-type robot 10, and, in the above-described embodiment, when the robot is operated again after the operation of the robot 20 is stopped, the environment detecting process may be performed. According to such a configuration, in a case where the installation situation of the simple installation-type robot 10 changes during the operation of the robot 20 such as a case where a vibration source is located near the simple installation-type robot 10, and the vibration source is driven during the operation of the robot 20, the robot 20 can be operated at the operating speed according to the changed installation situation.

In the simple installation-type robot 10 according to the above-described embodiment, the multi-joint robot having one 6-axis arm unit 30 is mounted. However, the invention is not limited thereto, and as long as the robot mounted in the simple installation-type robot can secure the degree of freedom that is necessary for the work, the number of axes of the arm unit may be five or less or seven or more, and a plurality of arm units may be included therein.

What is claimed is:

1. A robot controller that controls an operation of a robot mounted in a moving device, the robot controller comprising:
 a trial operation performing unit that allows the robot to perform a predetermined trial operation, wherein, during the predetermined trial operation, a vibration of the robot is measured as a measurement result;

a storage unit storing a plurality of operating speed information, wherein each of the operating speed information associates a respective magnitude of vibration with an operating speed appropriate for the vibration; and an operating speed output unit selecting and outputting a desired operating speed of the robot from among the operating speeds of the operating speed information stored in the storage unit based on the measurement result measured during the trial operation.

2. The robot controller according to claim 1, wherein the trial operation is configured by an operation period during which a predetermined operation is allowed to the robot and a maintaining period during which the robot is maintained in a predetermined posture after the operation period.

3. The robot controller according to claim 1, wherein the moving device includes casters and adjuster feet.

4. A simple installation-type robot comprising:
a robot;
a robot controller that controls an operation of a robot mounted in a moving device, the robot controller including:
  a trial operation performing unit that allows the robot to perform a predetermined trial operation, wherein, during the predetermined trial operation, a vibration of the robot is measured as a measurement result;
  a storage unit storing a plurality of operating speed information, wherein each of the operating speed information associates a respective magnitude of vibration with an operating speed appropriate for the vibration; and
  an operating speed output unit selecting and outputting a desired operating speed of the robot from among the operating speeds of the operating speed information stored in the storage unit based on the measurement result measured during the trial operation.

5. The simple installation-type robot according to claim 4, wherein the trial operation is configured by an operation period during which a predetermined operation is allowed to the robot and a maintaining period during which the robot is maintained in a predetermined posture after the operation period.

6. The simple installation-type robot according to claim 4, wherein the moving device includes casters and adjuster feet.

7. The simple installation-type robot according to claim 4, wherein the robot includes:
a base unit that is fixed to the moving device;
a first movable unit that is connected to the base unit; and
a second movable unit that is connected to the base unit through the first movable unit.

8. A method of controlling a simple installation-type robot in which a robot and a robot controller controlling the robot are mounted in a moving device, the method comprising:
allowing the robot to perform a predetermined trial operation;
measuring, during the predetermined trial operation, a vibration of the robot as a measurement result; and
selecting and outputting a desired operating speed of the robot from among a plurality of operating speed information based on the measurement result measured during the predetermined trial operation, wherein the plurality of operating speed information is predefined and stored in the robot controller, and each of the operating speed information associates a respective magnitude of vibration with an operating speed appropriate for the vibration.

* * * * *